(12) United States Patent
Wang et al.

(10) Patent No.: US 8,036,900 B2
(45) Date of Patent: Oct. 11, 2011

(54) DEVICE AND A METHOD OF PLAYING AUDIO CLIPS

(75) Inventors: Ye Wang, Singapore (SG); Wendong Huang, Singapore (SG); Samarjit Chakroborty, Singapore (SG)

(73) Assignee: National University of Singapore, Singapore (SG)

( * ) Notice: Subject to any disclaimer, the term of this patent is extended or adjusted under 35 U.S.C. 154(b) by 735 days.

(21) Appl. No.: 12/092,329

(22) PCT Filed: Nov. 3, 2006

(86) PCT No.: PCT/SG2006/000328
§ 371 (c)(1),
(2), (4) Date: Aug. 6, 2008

(87) PCT Pub. No.: WO2007/053120
PCT Pub. Date: May 10, 2007

(65) Prior Publication Data
US 2008/0306744 A1    Dec. 11, 2008

Related U.S. Application Data

(60) Provisional application No. 60/732,892, filed on Nov. 4, 2005.

(51) Int. Cl.
*G10L 11/00* (2006.01)
*H04H 20/88* (2008.01)
*G06F 1/32* (2006.01)
(52) U.S. Cl. ............. 704/270; 704/500; 381/2; 713/320
(58) Field of Classification Search ........................ None
See application file for complete search history.

(56) References Cited

U.S. PATENT DOCUMENTS 5,388,181 A    2/1995    Anderson et al.
2005/0102150 A1    5/2005    Lin et al.
(Continued)

FOREIGN PATENT DOCUMENTS

EP    0 402 973 B1    11/1994
(Continued)

OTHER PUBLICATIONS

Stautner, "Scalable Audio Compression for Mixed Computing Environments", Presented at the 93rd AES Convention, Oct. 1-4, 1992.*
(Continued)

*Primary Examiner* — Brian Albertalli
(74) *Attorney, Agent, or Firm* — Schwabe, Williamson & Wyatt, P.C.

(57) ABSTRACT

A device for playing audio clips, a method of playing audio clips and a data storage medium having stored thereon computer code means for instructing a computer system to execute a method of playing audio clips. The device comprising a processor scalable in voltage, frequency, or both; a switch for selecting one of a plurality of output modes of the device; and a controller for controlling the processor to decode input joint/MS stereo mode encoded audio data representing said audio clip based on the selected output mode; wherein each output mode defines a number, m, of subbands of an M channel and a number, s, of subbands of an S channel of the joint/MS stereo mode encoded data; and the controller controls the processor to decode and store only data from the m and s subbands for playback.

16 Claims, 10 Drawing Sheets

U.S. PATENT DOCUMENTS

2005/0226426 A1* 10/2005 Oomen et al. ............ 381/23
2006/0052129 A1* 3/2006 Hong et al. ............ 455/550.1

FOREIGN PATENT DOCUMENTS

WO     WO 95/30286     11/1995

OTHER PUBLICATIONS

International Search Report for Application PCT/SG2006/000328, mailed Jan. 17, 2007, 3 pages.
Written Opinion of the International Searching Authority for Application PCT/SG2006/000328, mailed on Jan. 17, 2007, 3 pages.
International Preliminary Report on Patentability for Application PCT/SG2006/000328, mailed May 6, 2008, 4 pages.
Le Cai et al., "Dynamic Power Management Using Data Buffers", Proceedings of the Design Automation and Test in Europe Conference and Exhibition (2004).
Kihwan Choi et al., "Frame-Based Dynamic Voltage and Frequency Scaling for a MPEG Decoder", Department of EE-Systems University of Southern California, Los Angeles, CA 90089, 2002, pp. 732-737.
Kihwan Choi et al., "Off-chip Latency-Driven Dynamic Voltage and Frequency Scaling for an MPEG Decoding", Department of EE Systems Univ. of Southern California, Los Angeles CA 90089, 2004, pp. 544-549.
Gang Qu et al., "Energy Minimization with Guaranteed Quality of Service", Computer Science Department, University of California, Los Angeles CA 90095, 2000, pp. 43-48.
Chaeseok Im et al., "Dynamic Voltage Scheduling with Buffers in Low-Power Multimedia Applications", ACM Transactions on Embedded Computing Systems, vol. 3, No. 4, Nov. 2004, pp. 686-705.
ISO/IEC 11172-3, Coding of moving pictures and associated audio for digital storage media at up to about 1.5 Mbit/s, 1993.
Alexander Maxiaguine et al., "Tuning SoC Platforms for Multimedia Processing: Identifying Limits and Tradeoffs", Computer Engineering and Networks Laboratory, ETH Zurich Department of Computer Science National University of Singapore, 2004.
Ye Wang et al., "A Framework for Robust and Scalable Audio Streaming", School of Computing National University of Singapore, 2004.
Wanghong Yuan et al., "Energy-Efficient Soft Real-Time CPU Scheduling for Mobile Multimedia Systems", Department of Computer Science University of Illinois at Urbana-Champaign, 1304 W. Springfield Ave., Urbana, IL 61801 USA, 2003, pp. 149-163.
Bernhard Grill et al., "A Bit Rate Scalable Perceptual Coder for MPEG-4 Audio", AES Convention 1997, Preprint 4620.
Patrick De Smet et al., "Do Not Zero-Pute: An Efficient Homespun MPEG-Audio Layer II Decoding and Optimization Strategy", In Proc. of ACM Multimedia, Oct. 2004, pp. 376-379.
Todd Austin et al., "SimpleScaler: An Infrastructure for Computer System Modeling", IEEE Computer, 35(2): 59-67, 2002.
Samarjit Chakroborty et al., "A Perception-Aware Low-Power Software Audio Decoder for Portable Devices", Department of Computer Science National University of Singapore, Proc. of ESTIMedia 2005.

* cited by examiner

| Group index | Decoded subband index | Frequency range (Hz) | Perceived quality level |
|---|---|---|---|
| Group 1 | 0-7 | 0 – 5512.5 | AM quality |
| Group 2 | 0-15 | 0 – 11025 | Near FM quality |
| Group 3 | 0-23 | 0 – 16537.5 | Near CD quality |
| Group 4 | 0-31 | 0 – 22050 | CD quality |

Figure 2

| Playback delay | m:32 s:32 | m:32 s:24 | m:32 s:16 | m:32 s:8 | m:32 s:0 | m:24 s:24 | m:24 s:16 | m:24 s:8 | m:24 s:0 | m:16 s:16 | m:16 s:8 | m:16 s:0 | m: 8 s:8 | m:8 s:0 |
|---|---|---|---|---|---|---|---|---|---|---|---|---|---|---|
| 0.5 sec | 322 | 292 | 257 | 221 | 169 | 244 | 211 | 177 | 130 | 162 | 129 | 88 | 85 | 50 |
| 1.0 sec | 314 | 285 | 251 | 216 | 165 | 238 | 206 | 172 | 127 | 158 | 126 | 86 | 83 | 48 |
| 2.0 sec | 299 | 270 | 238 | 205 | 156 | 226 | 195 | 163 | 120 | 150 | 119 | 82 | 78 | 46 |

Figure 4

DEVICE AND A METHOD OF PLAYING AUDIO CLIPS

FIELD OF INVENTION

The present invention relates broadly to a device for playing audio clips, a method of playing audio clips and a data storage medium having stored thereon computer code means for instructing a computer system to execute a method of playing audio clips.

BACKGROUND

Power consumption is a critical constraint in the design of both hardware and software for portable embedded systems. Many portable embedded systems are targeted towards streaming multimedia applications such as audio and video decoding. Typically, these multimedia applications exhibit a high variability in their computational demand.

Existing dynamic voltage/frequency scaling and dynamic power management techniques exploit this variability and slow down or switch-off the processor during periods of low demand in order to save energy. These techniques rely on predicting the variation of the computational demand and often using control-theoretic feedback schemes. However, such feedback schemes are computationally expensive and prone to errors.

Therefore, there is a need to provide a technique or scheme that seeks to address at least one of the above-mentioned problems.

SUMMARY

In accordance with a first aspect of the present invention, there is provided a device for playing audio clips, the device comprising a processor scalable in voltage, frequency, or both; a switch for selecting one of a plurality of output modes of the device; and a controller for controlling the processor to decode input joint/MS stereo mode encoded audio data representing said audio clip based on the selected output mode; wherein each output mode defines a number, m, of subbands of an M channel and a number, s, of subbands of an S channel of the joint/MS stereo mode encoded data; and the controller controls the processor to decode and store only data from the m and s subbands for playback.

The number, s, of subbands of the S channel may be smaller or equal to the number, m, of subbands of the M channel.

Wherein s<m, the controller may control the processor to copy [s+1, m] subbands of the M channel that remain unchanged after a joint/MS stereo mode processing.

Each output mode may be associated with a different power consumption of the processor for decoding.

Each output mode may be associated with a minimum required processor frequency for decoding.

Each output mode may be associated with a different output bandwidth.

Each output mode may be associated with a different quality level.

In accordance with a second aspect of the present invention, there is provided a method of playing audio clips, the method comprising selecting one of a plurality of output modes; controlling a processor, the processor being scalable in voltage, frequency, or both, to decode input joint/MS stereo mode encoded audio data representing said audio clip based on the selected output mode; wherein each output mode defines a number, m, of subbands of an M channel and a number, s, of subbands of an S channel of the joint/MS stereo mode encoded data; and controlling the processor to decode and store only data from the m and s subbands for playback.

Wherein s<m, the method may further comprise controlling the processor to copy [s+1, m] subbands of the M channel that remain unchanged after the joint/MS stereo mode processing.

Each output mode may be associated with a different power consumption of the processor for decoding.

Each output mode may be associated with a minimum required processor frequency for decoding.

Each output mode may be associated with a different output bandwidth.

Each output mode may be associated with a different quality level.

In accordance with a third aspect of the present invention, there is provided a data storage medium having stored thereon computer code means for instructing a computer system to execute a method of playing audio clips, the method comprising the steps of selecting one of a plurality of output modes; controlling a processor, the processor being scalable in voltage, frequency, or both, to decode input joint/MS stereo mode encoded audio data representing said audio clip based on the selected output mode; wherein each output mode defines a number, m, of subbands of an M channel and a number, s, of subbands of an S channel of the joint/MS stereo mode encoded data; and controlling the processor to decode and store only data from the m and s subbands for playback.

BRIEF DESCRIPTION OF THE DRAWINGS

Embodiments of the invention will be better understood and readily apparent to one of ordinary skill in the art from the following written description, by way of example only, and in conjunction with the drawings, in which:

FIG. 2 shows a table listing four frequency band groups.

FIG. 4 shows a table listing the minimum required frequency for different decoding levels at three different playback delay values.

DETAILED DESCRIPTION

Figure 1:
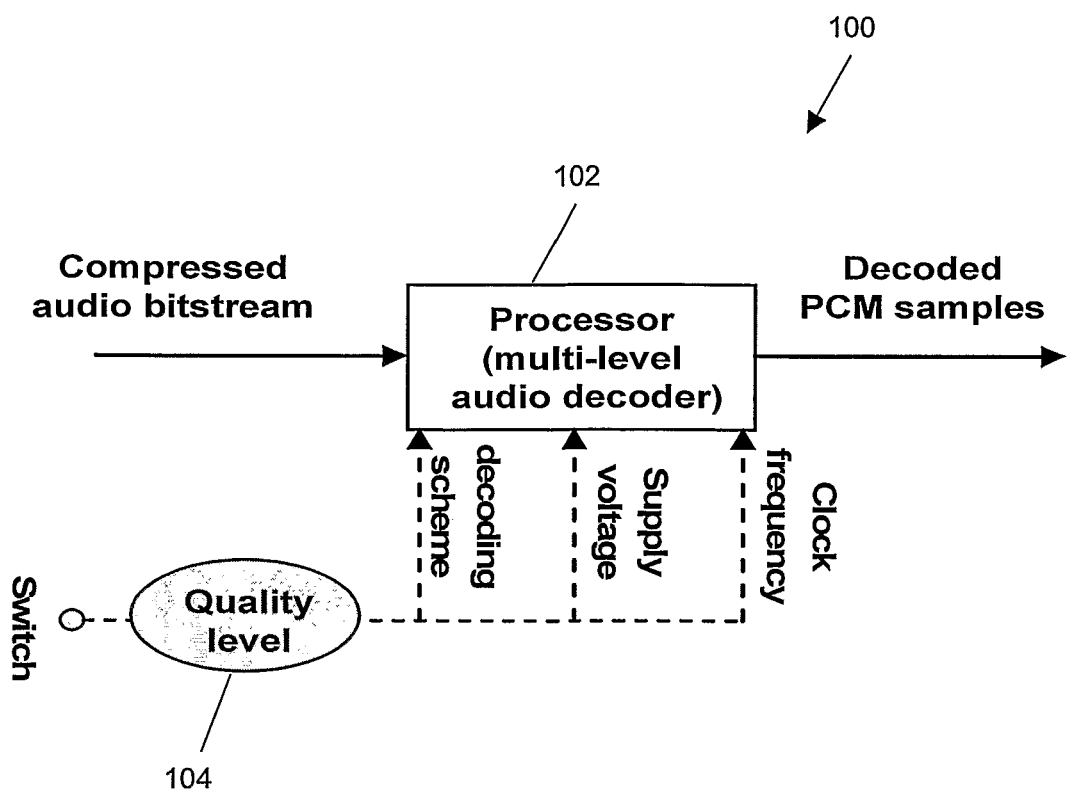
FIG. 1 shows a schematic drawing of a Bandwidth and Stereo-image Scalable-MPEG audio layer 3 (BSS-MP3) decoder.

A Stereo-image scalable audio decoding scheme for audio files encoded using joint/MS stereo mode is described herein. In the example embodiment, a Bandwidth and Stereo-image Scalable (BSS) decoding scheme for single-layer audio formats such as MP3 is described. The BSS decoding scheme is based on an analysis of the perceptual relevance of different audio components in a compressed bitstream. The bandwidth and stereo-image scalability directly translates into scalability in terms of the computational workload generated by a decoder. This can be exploited by a voltage/frequency scalable processor to save energy and prolong the battery life.

The BSS decoding scheme allows users to control the tradeoff between battery life and decoded audio quality, taking into account that a slight degradation in audio quality may not be perceptible to the user but can significantly increase the battery life of the player. This allows the users to control the quality level of the decoded audio according to his hearing ability, the listening environment, and the required service type. The users are also able to control the quality level at the decoder side. In addition, the users are able to switch between multiple output quality levels for a single-layer audio format such as MP3. Each quality level is associated with a different level of power consumption. Further, the BSS decoding scheme is easy to implement, has no runtime overhead and does not involve any runtime voltage or frequency scaling.

A standard MP3 decoder is redesigned into a BSS-MP3 decoder for implementation of the BSS decoding scheme. It will be appreciated by a person skilled in the art that the BSS decoding scheme can also be implemented using any perceptual audio decoder.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "decoding", "processing", "unpacking", "computing", "storing", "copying", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the preferred method.

FIG. 1 shows a schematic drawing of the BSS-MP3 decoder 100. The BSS-MP3 decoder 100 comprises a processor 102 and a manual switch 104. The processor 102 converts compressed audio bitstream into pulse code modulation (PCM) audio samples. The manual switch 104 is coupled to the processor 102. The manual switch 104 allows the user to choose the quality level manually to decode any audio clip according to the decoding scheme or algorithm for the specified level, and the voltage and the frequency with which the processor 102 runs the decoding scheme. When a clip is decoded at a lower quality level, the processor 102 can be run at a lower frequency and voltage. As a result, power saving is advantageously achieved.

The BSS decoding scheme is a multi-level decoding scheme which is based on distinguishing the perceptual significance associated with different frequency bands and channels, which eliminates perceptually irrelevant computation. Therefore, the BSS decoding scheme is advantageously more effective in workload reduction in comparison with other existing optimization techniques such as the "do not zero-pute" algorithm (P. De Smet, F. Rooms, H. Liong, and W. Philips. Do not zero-pute: An efficient homespun MPEG-Audio layer II decoding and optimization strategy, In Proc. of ACM Multimedia 2004, October 2004).

The BSS-MP3 decoder 100 combines frequency bandwidth and stereo-image scalability, resulting in a number of decoding levels. Each decoding level is associated with a different playback quality. Details of frequency bandwidth and stereo-image scalability are described in the following.

To achieve frequency bandwidth scalability, 32 subbands defined in the MPEG 1 audio standard are partitioned into four groups. Each group corresponds to a perceptual quality level. FIG. 2 shows a table listing the four frequency band groups. A sampling frequency of about 44.1 kHz is used as an illustration.

Frequency band group 1 covers the lowest frequency bandwidth of about 5.5 kHz, which is defined as the base layer. Although group 1 occupies only a quarter of the total bandwidth and contributes to roughly a quarter of the total computational workload, it is perceptually the most relevant frequency band. The output audio quality is of amplitude modulation (AM) quality and is sufficient for services such as news and sports commentaries.

Group 2 covers a bandwidth of about 11 kHz and the output audio quality is of frequency modulation (FM) radio quality, which is sufficient for listening to music clips especially in noisy environments. Group 3 covers a bandwidth of about 16.5 kHz and produces an output audio quality that is very close to compact disc (CD) quality. Group 4 covers the full bandwidth of about 22 kHz, which corresponds to the standard MP3 decoder. The corresponding output audio quality is of CD quality.

In the example embodiment, the MP3 is encoded using the joint/MS stereo mode. This mode exploits the similarity between the left and the right channel signals. The left and right channels are encoded as the middle (M) and side (S) channel in the MP3 file. The M channel contains the most essential information from both left and right channels and the S channel is only responsible for providing the stereo image. Hence, the M channel is perceptually more significant than the S channel despite the similar computational workload involved in decoding it. As such, the inventors have recognised that the S channel can be partially decoded or discarded completely when a smaller workload and a longer battery life is desired.

Figure 3:
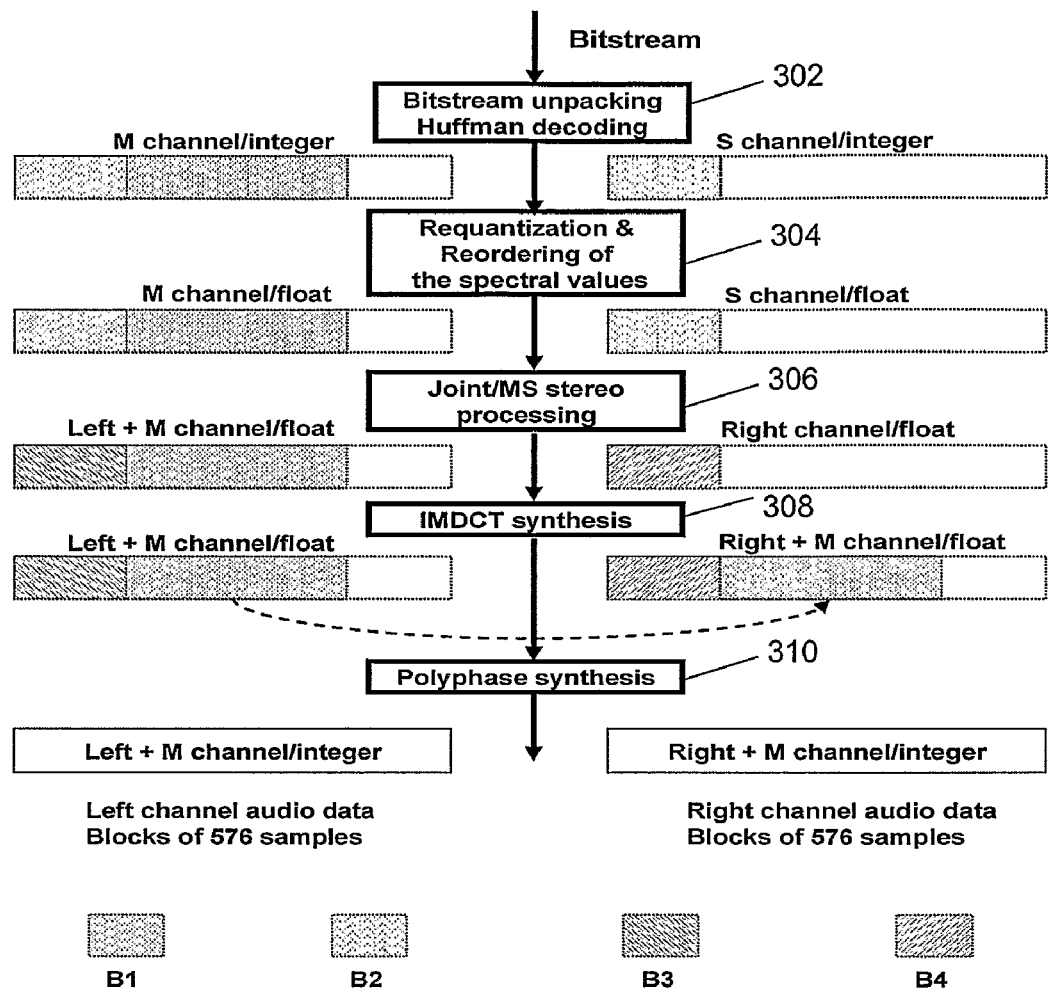
FIG. 3 shows a flow chart of processes of a BSS decoding scheme executed by the BSS-MP3 decoder

FIG. 3 shows a flow chart of processes of the BSS decoding scheme executed by the BSS-MP3 decoder 100. The processes are bitstream unpacking and Huffman decoding 302, de-quantization and reordering of spectral values 304, joint/ MS processing 306, Inverse Modified Discrete Cosine Transform (IMDCT) processing 308 and polyphase synthesis 310.

The processes which incur the most computational workload are de-quantization 304, IMDCT processing 308 and polyphase synthesis 310. A standard MP3 decoder decodes the entire frequency band, which corresponds to the highest computational workload. For the BSS-MP3 decoder 100, the above three modules process only a partial frequency range depending on the decoding level selected by the user. Thus, less computational cost is incurred. In FIG. 3, B1 denotes the selected bandwidth for the M channel, B2 for the S channel, B3 for the left channel and B4 for right channel, respectively.

Assuming that the lower m subbands of the M channel and the lower s subbands of the S channel, where $s \leq m$, are decoded by BSS-MP3 decoder 100. This implies an asymmetric decoding where more subbands of M channel are decoded than the S channel. However, symmetric partial MS decoding is also possible when $s=m$.

As shown in FIG. 3, our BSS-MP3 decoder 100 decodes and stores only data from the lower m and s subbands for M and S channels respectively after Huffman decoding. Due to the absence of the group of [s+1, m] subbands in the S channel, [s+1, m] subbands of the M channel remain unchanged after the joint/MS stereo processing module. They are simply copied to both the left and the right channels, as indicated by the dashed line after the IMDCT module in FIG. 3. The only true stereo components are the lower s subbands in the left and the right channels.

During the above processes, the computational workload of the BSS-MP3 decoder 100 advantageously decreases almost linearly with the decreasing number of decoded subbands in both the channels. Energy savings and effectiveness of the BSS-MP3 decoder 100 are evaluated and the details and the results of the evaluations are described below.

The energy savings resulting from the BSS-MP3 decoder 100 is evaluated using audio clips with a bit rate of about 128 kbits/sec. All the audio clips were of a sampling rate of about 44.1 kHz and a duration of about 20 s and were coded in the joint stereo mode. The processor model was based on the Sim-Profile configuration of the SimpleScalar instruction set simulator. The BSS-MP3 decoder 100 is simulated with three different playback delay values, which are about 0.5, 1 and 2 seconds (s) respectively.

FIG. 4 shows a table listing the minimum required frequency for different decoding levels at the three different playback delay values. These frequency values were computed by taking into account both, the variability in the processor cycle requirements of the different granules in the MP3 bitstream and the number of bits constituting each granule. As the playback delay value was increased from about 0.5 s to about 1 s and 2 s, the minimum required frequency showed a moderate decrease for all the decoding levels. The reason behind this is the increased buffering time which smoothens some of the variability in the workload.

Figure 5:
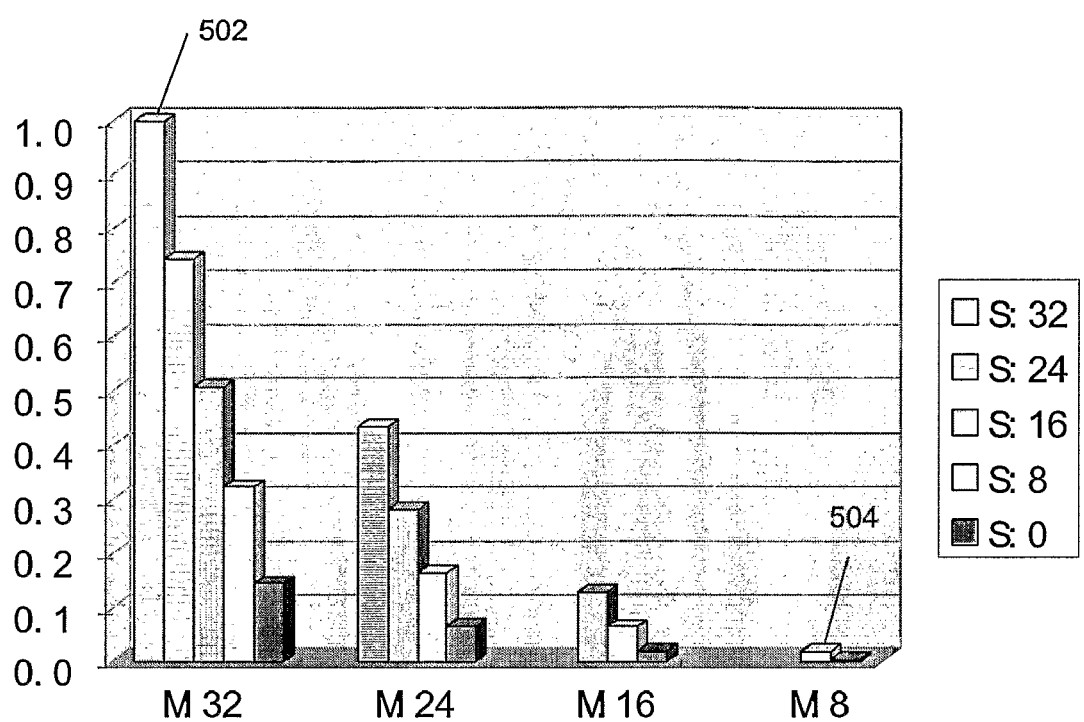
FIG. 5 shows a chart of normalized energy consumption for 14 different decoding levels when the playback delay is set at 0.5 seconds.

FIG. 5 shows a chart of normalized energy consumption for 14 different decoding levels when the playback delay is set at about 0.5 s. From FIG. 5, the decoding configuration (m:32, s:32) 502 consumes the highest amount of normalized energy, which is about 0.99. This corresponds to a standard MP3 output. On the other hand, the decoding configuration (m:8, s:8) 504 consumes normalized energy of about 0.01. An energy saving of about 98% is advantageously achieved when the decoding configuration (m:8,s:8) 504 is selected.

To evaluate the effectiveness of the BSS-MP3 decoder 100, confidential experiments are carried out on 13 subjects. All subjects were asked to evaluate the audio quality using the mean opinion score (MOS), which is a five-point scale (5—excellent, 4—good, 3—fair, 2—poor, and 1—bad). Five music clips were used for evaluation of which four were pop music and one was pure instrumental classic music. These MP3 clips were all of joint stereo mode, had a sampling rate of about 44.1 kHz and a bitrate equal to about 128 kbits/sec. Five different copies of each music clip were prepared for testing. These copies were generated by the BSS-MP3 decoder 100 with profiles of (m:32, s:32), (m:32, s:24), (m:32, s:16), (m:32, s:8), (m:32, s:0) respectively. Each music clip had two additional copies with profiles of (m:32, s:32) and (m:8, s:8) which were used as anchor quality references. The profile of (m:32, s:32) was at a MOS scale of 5 and the profile of (m:8, s:8) was at a MOS scale of 3. All test samples were arranged in a random order except for the anchor quality references. Two sets of subjective evaluations, i.e. one for evaluating stereo-image scalability and the other for evaluating bandwidth scalability, were carried out.

Figure 6:
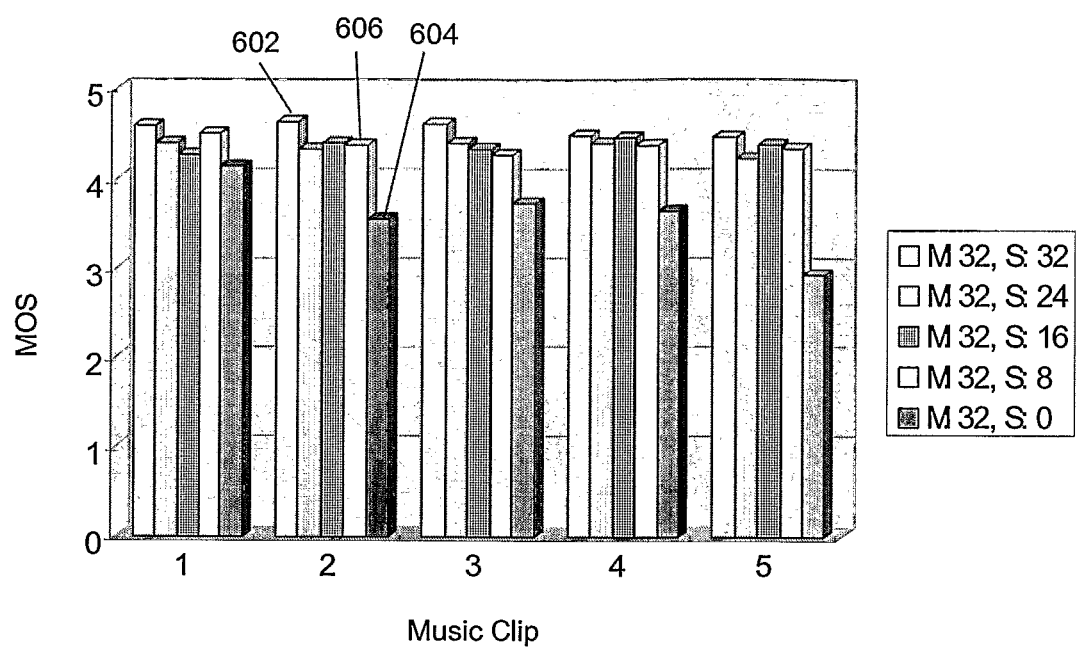
FIG. 6 shows a chart of mean opinion score for 5 different profiles of 5 different music clips.

The results of the first evaluation on stereo-image scalability are shown in FIG. 6. FIG. 6 shows a chart of MOS for 5 different profiles of 5 different music clips. It is observed that discarding S channel completely, i.e. converting stereo to mono (m:32; s:32 (602) to m:32; s:0 (604)), results in noticeable quality degradation. When the entire M channel and the lower quarter of S channel are decoded (i.e., m:32; s:32 (602) to m:32; s:8 (606)), the quality degradation is negligible. Even though only the lower quarter of S channel is decoded, a satisfactory playback audio quality is advantageously provided. This shows that the low frequency band (Group 1 of FIG. 1) is significantly more important than the higher frequency bands. In addition, a reduction of processor frequency of about 30%, which corresponds to a power savings of approximately 70% is advantageously achieved.

Figure 7:
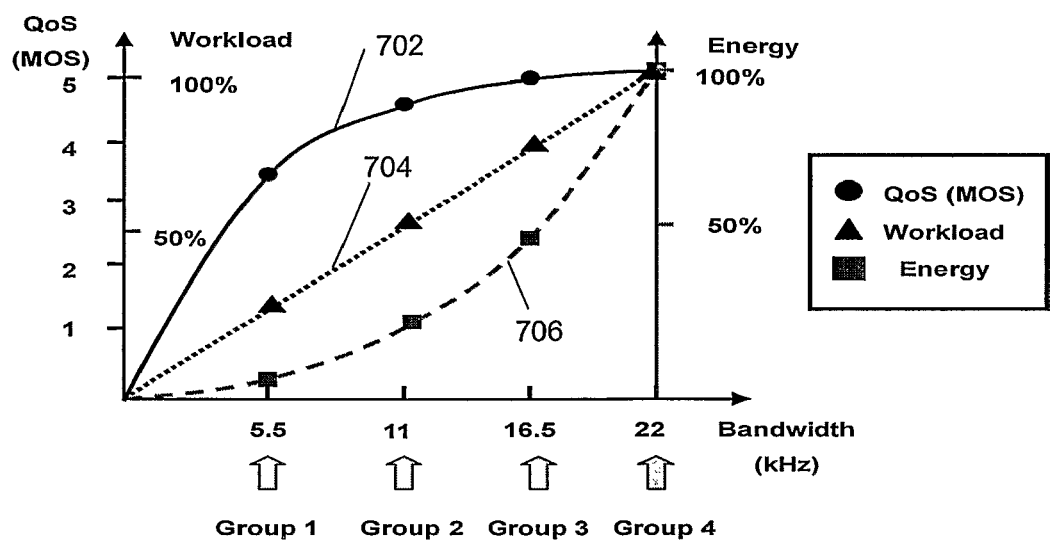
FIG. 7 shows respective plots of mean opinion score, workload and energy consumption against bandwidth.

For the second evaluation on bandwidth scalability, symmetric M and S channel decoding, i.e. both M and S channels are partially decoded, is carried out. FIG. 7 shows the results of the second evaluation. FIG. 7 shows a plot of mean opinion score against bandwidth 702, a plot of workload against bandwidth 704 and a plot of energy consumption against bandwidth 706. The plot 702 shows that switching from the frequency band group 4 to 3 results in almost no degradation in the perceptual audio quality. However, the plot 706 shows that switching from the frequency band group 4 to 3 advantageously achieves a reduction in energy consumption of more than about 50%. Consequently, the battery life is extended. Significant power savings are advantageously obtained by allowing a slightly degraded output audio quality.

The plot 704 shows that the workload of the BSS-MP3 decoder 100 is roughly proportional to the frequency bandwidth to be decoded. Therefore, reducing the decoded audio bandwidth results in a gradual reduction in audio quality but a sharp reduction in the energy consumption.

Figure 8:
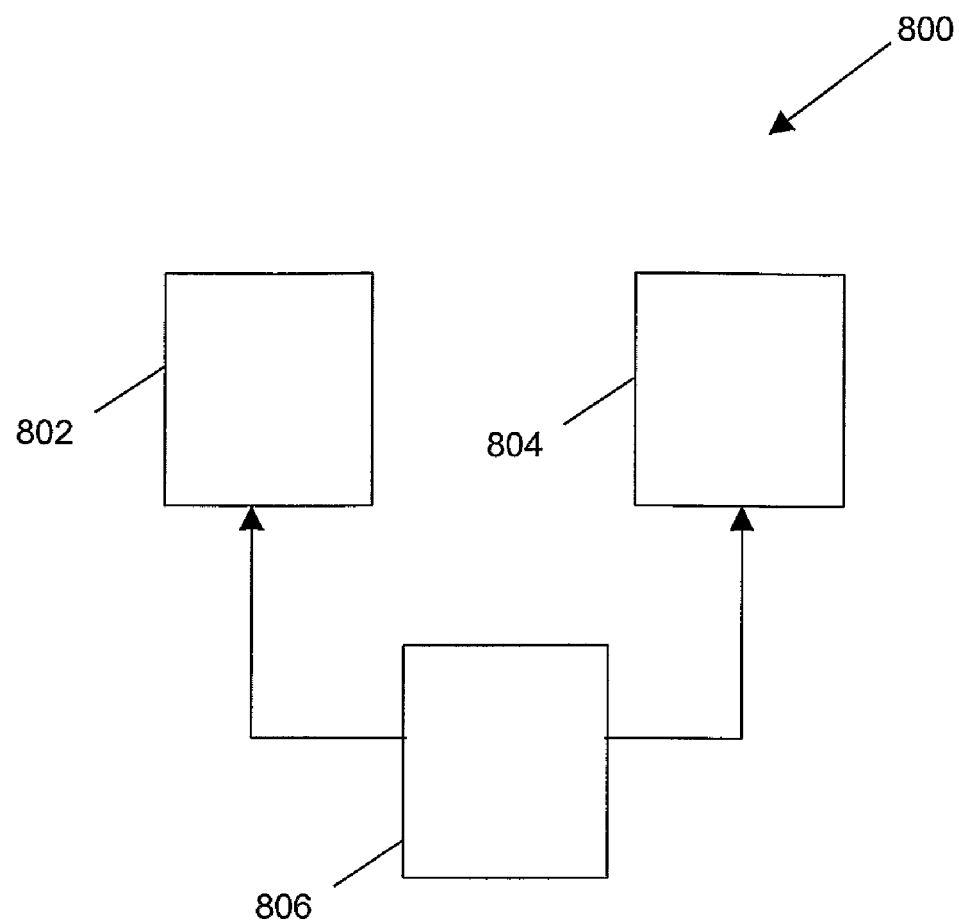
FIG. 8 shows a schematic diagram of a device for playing audio clips.

FIG. 8 shows a schematic diagram of a device 800 for playing audio clips according to an embodiment. The device 800 comprises a processor 802 scalable in voltage, frequency, or both. The device 800 further comprises a switch 804 for selecting one of a plurality of output modes of the device. The device 800 also comprise a controller 806, which is coupled to the processor 802 and the switch 804, for controlling the processor to decode input joint/MS stereo mode encoded audio data representing the audio clip based on the selected output mode, wherein each output mode defines a number, m, of subbands of an M channel and a number, s, of subbands of an S channel of the joint/MS stereo mode encoded data. The controller 806 controls the processor 802 to decode and store only data from the m and s subbands for playback.

Figure 9:
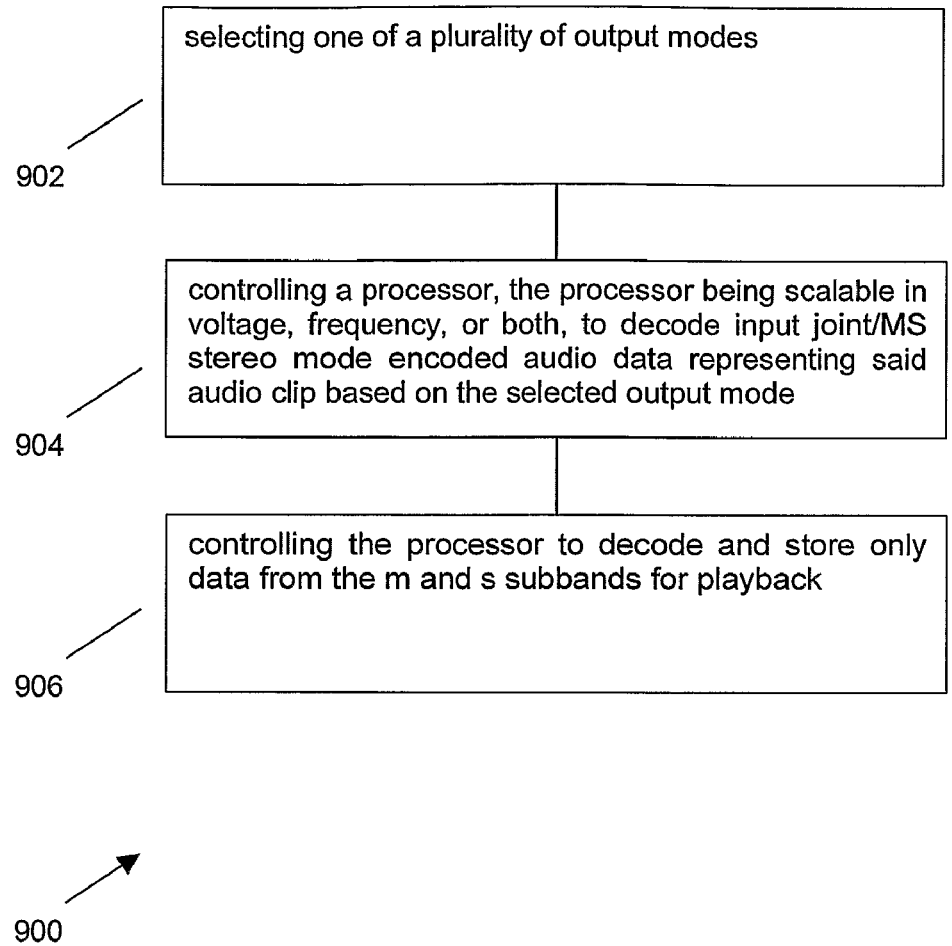
FIG. 9 shows a flowchart illustrating a method of playing audio clips.

FIG. 9 shows a flowchart 900 illustrating a method of playing audio clips according to an embodiment. At step 902, one of a plurality of output modes is selected. At step 904, a processor is controlled and the processor is scalable in voltage, frequency, or both, to decode input joint/MS stereo mode encoded audio data representing the audio clip based on the selected output mode, wherein each output mode defines a number, m, of subbands of an M channel and a number, s, of subbands of an S channel of the joint/MS stereo mode encoded data. At step 906, the processor is controlled to decode and store only data from the m and s subbands for playback.

Figure 10:
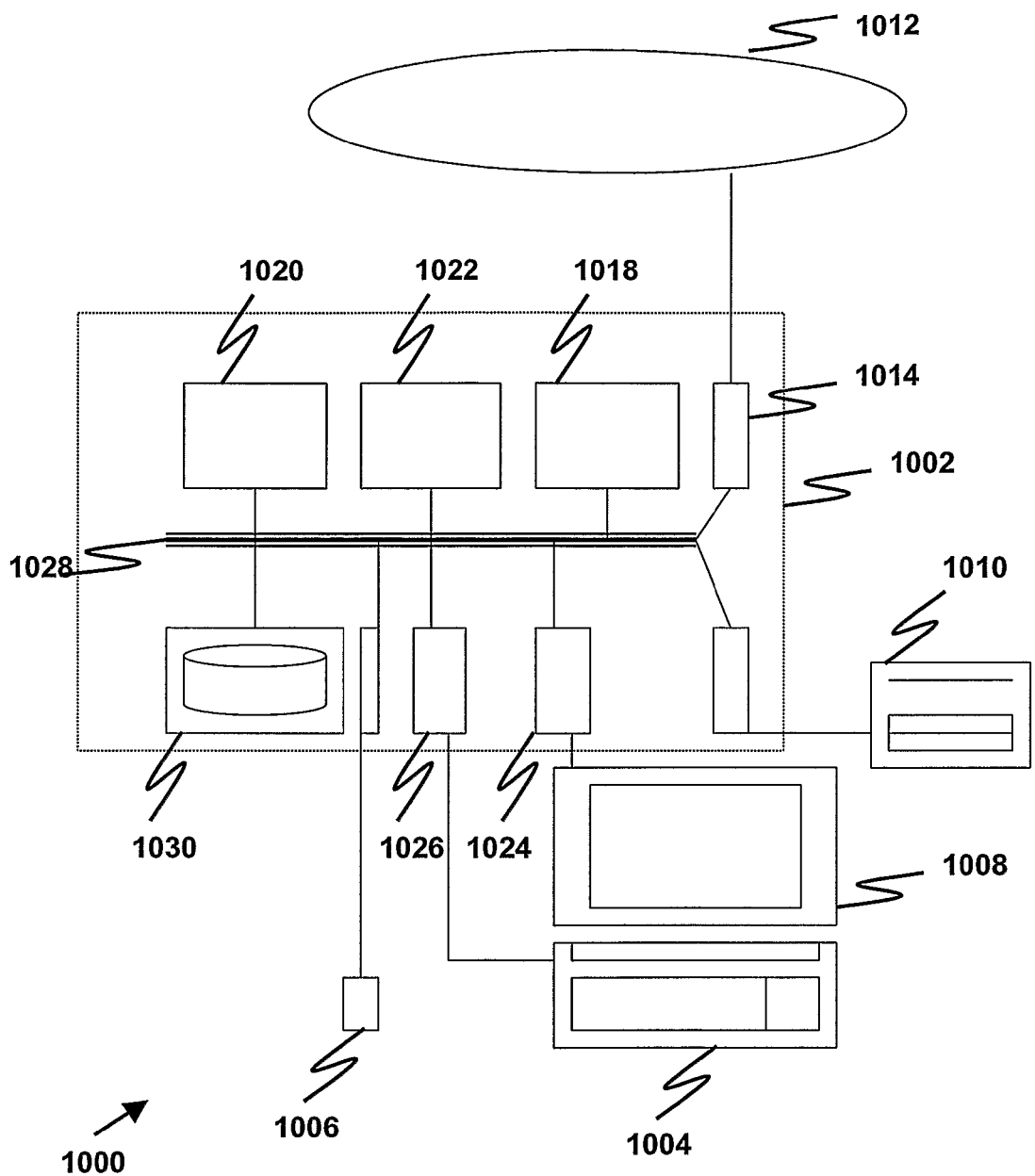
FIG. 10 shows a schematic diagram of a computer system for implementing the described method and system.

The described method and system can be implemented on a computer system 1000, schematically shown in FIG. 10. It may be implemented as software, such as a computer program being executed within the computer system 1000, and instructing the computer system 1000 to conduct the method of the example embodiment.

The computer system 1000 comprises a computer module 1002, input modules such as a keyboard 1004 and mouse 1006 and a plurality of output devices such as a display 1008, and printer 1010.

The computer module 1002 is connected to a computer network 1012 via a suitable transceiver device 1014, to enable access to e.g. the Internet or other network systems such as Local Area Network (LAN) or Wide Area Network (WAN).

The computer module 1002 in the example includes a processor 1018, a Random Access Memory (RAM) 1020 and a Read Only Memory (ROM) 1022. The computer module 1002 also includes a number of Input/Output (I/O) interfaces, for example I/O interface 1024 to the display 1008, and I/O interface 1026 to the keyboard 1004.

The components of the computer module 1002 typically communicate via an interconnected bus 1028 and in a manner known to the person skilled in the relevant art.

The application program is typically supplied to the user of the computer system 1000 encoded on a data storage medium such as a CD-ROM or flash memory carrier and read utilising a corresponding data storage medium drive of a data storage device 1030. The application program is read and controlled in its execution by the processor 1018. Intermediate storage of program data maybe accomplished using RAM 1020.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:
1. A device comprising:
   a processor; and
   a controller coupled to the processor and configured to control the processor to decode input joint/MS stereo mode encoded audio data representing an audio clip based on a selected one of a plurality of output modes of the device;
   wherein each output mode defines a number, m, of subbands of an M channel and a number, s, of subbands of an S channel of the joint/MS stereo mode encoded data; and the controller is configured to control the processor to decode and store only data from the m and s subbands for playback; and
   wherein the number, s, of subbands of the S channel is smaller or equal to the number, m, of subbands of the M channel.

2. The device as claimed in claim 1, wherein the controller is further configured to control the processor to copy [s+1, m] subbands of the M channel that remain unchanged after a joint/IMS stereo mode processing.

3. The device as claimed in claim 1, wherein each output mode is associated with a different power consumption of the processor for decoding.

4. The device as claimed in claim 1, wherein each output mode is associated with a minimum required processor frequency for decoding.

5. The device as claimed in claim 1, wherein each output mode is associated with a different output bandwidth.

6. The device as claimed in claim 1, wherein each output mode is associated with a different quality level.

7. The device as claimed in claim 1, wherein the processor is scalable in voltage, frequency, or both.

8. The device of claimed in claim 1, further comprising a switch coupled to the controller, and configured to enable selection of one of the plurality of output modes.

9. A method comprising:
   receiving by a device, a selection for one of a plurality of output modes; and
   controlling decoding, by the device, input joint/MS stereo mode encoded audio data representing an audio clip based on the selected output mode;
   wherein each output mode defines a number, m, of subbands of an M channel and a number, s, of subbands of an S channel of the joint/MS stereo mode encoded data; and controlling includes controlling decoding and storage of only data from the m and s subbands for playback; and
   wherein the number, s, of subbands of the S channel is smaller or equal to the number, m, of subbands of the M channel.

10. The method as claimed in claim 9, wherein controlling includes controlling copying of [s+1, m] subbands of the M channel that remain unchanged after a joint/IMS stereo mode processing.

11. The method as claimed in claim 9, wherein each output mode is associated with a different power consumption of the processor for decoding.

12. The method as claimed in claim 11, wherein each output mode is associated with a minimum required processor frequency for decoding.

13. The method as claimed in claim 9, wherein each output mode is associated with a different output bandwidth.

14. The method as claimed in claim 9, wherein each output mode is associated with a different quality level.

15. An article of manufacture, comprising:
   a tangible non-transitory computer-readable storage medium; and
   a plurality of programming instructions stored in the storage medium, configured to enable an apparatus, in response to execution of the instructions by the apparatus, to perform operations including:

receiving selection of one of a plurality of output modes; and controlling decoding of input joint/MS stereo mode encoded audio data representing an audio clip based on the selected output mode;

wherein each output mode defines a number, m, of subbands of an M channel and a number, s, of subbands of an S channel of the joint/MS stereo mode encoded data; and controlling comprises controlling decoding and storage of only data from the m and s subbands for playback;

wherein the number, s, of subbands of the S channel is smaller or equal to the number, m, of subbands of the M channel.

16. The article as claimed in claim 15, wherein controlling includes controlling copying of [s+1, m] subbands of the M channel that remain unchanged after a joint/IMS stereo mode processing.

* * * * *

UNITED STATES PATENT AND TRADEMARK OFFICE
CERTIFICATE OF CORRECTION

| | | |
|---|---|---|
| PATENT NO. | : 8,036,900 B2 | Page 1 of 1 |
| APPLICATION NO. | : 12/092329 | |
| DATED | : October 11, 2011 | |
| INVENTOR(S) | : Wang et al. | |

It is certified that error appears in the above-identified patent and that said Letters Patent is hereby corrected as shown below:

Title Page, item (60), under "Related U.S. Application Data", in Column 1, Line 1, delete "60/732,892," and insert -- 60/733,892, --.

Column 7, line 66, in Claim 1, delete "device" and insert -- device, --.

Column 8, line 18, in Claim 2, delete "joint/IMS" and insert -- joint/MS --.

Column 8, line 31, in Claim 8, delete "The device of claimed in claim 1," and insert -- The device as claimed in claim 1, --.

Column 8, line 34, in Claim 9, delete "method" and insert -- method, --.

Column 8, line 51, in Claim 10, delete "joint/IMS" and insert -- joint/MS --.

Column 10, line 9, in Claim 16, delete "joint/IMS" and insert -- joint/MS --.

Signed and Sealed this
Nineteenth Day of June, 2012

David J. Kappos
*Director of the United States Patent and Trademark Office*